United States Patent
Tranovich et al.

(10) Patent No.: US 7,066,189 B2
(45) Date of Patent: Jun. 27, 2006

(54) PREDICTIVE MAINTENANCE AND INITIALIZATION SYSTEM FOR A DIGITAL SERVOVALVE

(75) Inventors: Stephen J. Tranovich, Avon, CT (US); Phillip S. Gross, Meriden, CT (US)

(73) Assignee: Control Components, Inc., Rancho Santa Margarita, CA (US)

( * ) Notice: Subject to any disclaimer, the term of this patent is extended or adjusted under 35 U.S.C. 154(b) by 118 days.

(21) Appl. No.: 10/739,800

(22) Filed: Dec. 18, 2003

(65) Prior Publication Data

US 2005/0000580 A1 Jan. 6, 2005

Related U.S. Application Data

(60) Provisional application No. 60/435,825, filed on Dec. 20, 2002.

(51) Int. Cl.
  *F15B 13/044* (2006.01)

(52) U.S. Cl. ............... 137/1; 91/362; 137/554; 137/625.65

(58) Field of Classification Search ............ 137/1, 137/554, 625.65; 91/362
See application file for complete search history.

(56) References Cited

U.S. PATENT DOCUMENTS 4,951,549 A * 8/1990 Olsen et al. ............... 91/362

* cited by examiner

*Primary Examiner*—Gerald A. Michalsky

(57) ABSTRACT

Provided is a servovalve system for regulating fluid flowing within a fluid circuit. The servovalve system comprises a housing, a spool slidably disposed within the housing, a stepper motor operatively connected to the spool, and a controller and a position sensor electronically connected to the stepper motor. The controller generates driver signals representative of a desired amount of stepper motor rotation in order to cause the stepper motor to effectuate spool motion relative to the housing. The position sensor senses an actual amount of stepper motor rotation and generates a quantity of position signals representative thereof. The controller determines a signal ratio of the quantity of the position signals to the quantity of the driver signals and generates a diagnostic signal when the signal ratio reaches a threshold value representative of a predetermined level of mechanical resistance of spool motion relative to the housing.

21 Claims, 4 Drawing Sheets

PREDICTIVE MAINTENANCE AND INITIALIZATION SYSTEM FOR A DIGITAL SERVOVALVE

CROSS-REFERENCE TO RELATED APPLICATIONS

The present application claim priority to U.S. Provisional Application Ser. No. 60/435,825 entitled PREDICTIVE MAINTENANCE AND INITIALIZATION SYSTEM FOR A DIGITAL SERVOVALVE filed Dec. 20, 2002.

STATEMENT RE: FEDERALLY SPONSORED RESEARCH/DEVELOPMENT (Not Applicable)

BACKGROUND OF THE INVENTION

The present invention relates to fluid flow control and, more particularly, to a system and method for initializing and monitoring the operation of a servovalve system for controlling the flow of fluid within a fluid circuit.

Servovalves are often utilized to precisely manipulate or regulate the flow rate and/or pressure of fluid flowing within a fluid circuit. The fluid, which can include both liquids and gases, is typically employed to move an actuator which is conventionally comprised of a piston sealed within a cylinder. The fluid circuit moves the piston by forcing fluid into one end of the cylinder while simultaneously withdrawing or exhausting the fluid out of an opposing end of the cylinder. Servovalves are most often used in closed-loop systems wherein the position of the actuator, and velocity and/or pressure of fluid flowing within the fluid circuit is continuously monitored with a feedback device which generates system feedback signals. A controller uses the system feedback signals to generate command signals that are received by the servovalve to minimize the error between a desired position of the piston and an actual position of the piston within the cylinder.

Servovalves generally incorporate a spool which either rotates or slides axially in a housing to port the fluid flow to a desired location. Stepper motors are often utilized to move the spool relative to the housing such that the flow of fluid within the fluid circuit may be manipulated. The positioning of the spool by stepper motors is well established in the prior art. Servovalves which utilize stepper motors typically position the spool in an open-loop fashion wherein the spool must be initialized. During initialization, the spool is moved to a starting point or initialization position from where the stepper motor may initiate movement of the spool to a desired position. The initialization position may be set by a spring. The controller may command the stepper monitor to move the spool in such a manner that the controller may track a sequence of command signals from the initialization position and thus maintain a virtual spool position in its memory. As long as the stepper motor precisely tracks the sequence of command signals, the error between the desired position and the actual position of the piston may be minimized.

Unfortunately, the accuracy with which the stepper motor tracks the sequence of command signals may diminish over time due to the buildup of mechanical impediments or resistance between the spool and the housing. Such mechanical resistance may include excessive friction between the spool and the housing. The mechanical resistance may also include contamination or corrosion of the spool, housing, or other servovalve components. In the prior art, servovalves that are driven by stepper motors have been fitted with optical encoders to confirm that the actual position of the stepper motor is tracking a commanded or desired position of the stepper motor and, hence, the spool position.

In such systems, the optical encoder may generate an error signal if the stepper motor fails to track the desired position. Such error signal may be indicative of a relatively high level of mechanical resistance between the spool and the housing such that corrective action must be taken. However, without the capability to continuously monitor mechanical resistance between the spool and the housing, inaccurate positioning of the piston within the cylinder may occur such that safety may be compromised. As may be seen, it would be highly desirable to provide the capability to continuously monitor mechanical resistance between the spool and the housing such that preventative maintenance may be performed on the spool and/or housing before occurrence of a failure.

Furthermore, for prior art servovalves that utilize springs to initialize the spool, the springs are generally of a torsional type. In the case of very large servovalves requiring multiple rotations of the stepper motor to achieve the desired spool position, such springs become unwieldy arrangements of clock springs that may be impractical to implement. Prior art solutions for initializing the spool include various types of external devices such as limit switches, proximity switches, and photo sensing devices. Unfortunately, such prior art solutions present mechanical and wiring problems within the servovalve. Furthermore, such prior art solutions complicate the initialization process. As can be seen, it is highly desirable to provide an initialization means that is not dependent upon an external device.

The prior art in the field of stepper motors for monitoring of the spool and/or stepper motor position includes independent position sensors added to the servovalve to accomplish certain control functions requiring feedback. Optical encoders are one example of such independent position sensors, as was earlier mentioned. Other prior art systems for monitoring of the spool and/or stepper motor position includes commutation schemes wherein driver signals are provided in such a manner as to improve phase angle lead or lag in conventional stepper motor applications as is provided in U.S. Pat. No. 4,426,608 to Larson, et al., U.S. Pat. No. 5,256,943 to German, U.S. Pat. No. 4,949,027 to Baur, U.S. Pat. No. 4,884,016 to Aiello, and U.S. Pat. No. 4,761,598 to Lovenich.

Other prior art systems for monitoring of stepper motor position is related to improvement of dynamic positional accuracy of stepper motor control systems. For example, U.S. Pat. No. 6,013,998 to Spurr et al. ("the Spur reference") discloses a stepper motor configured to turn a lead screw in microstepping mode. Baseline measurements of position errors occurring in the Spurr reference are utilized in an algorithm developed to reinforce sine/cosine current profiles that are typically used in microstepping a stepper motor so as to reduce overall position error. It should be noted that the position error addressed by the Spur reference is dynamic (i.e., in motion) and that the system of the Spur reference does not utilize position feedback during operation.

U.S. Pat. No. 5,029,264 to Ito et al. ("the Ito reference") describes a recording apparatus which employs a stepper motor that is utilized in conjunction with an encoder. In the apparatus of the Ito reference, the encoder is of sufficient resolution such that its signal can be used by a controller to commutate the current to the stepper motor windings such that the stepper motor is effectively utilized as a multi-pole brushless motor. To accomplish this, the apparatus of the Ito reference synchronizes magnetic poles of the motor with pulses generated by the encoder. By commutating in this fashion, lower noise and higher speeds are obtained in dynamic operation of the apparatus. It should be noted that Ito describes an additional initialization sequence in which a carriage of the apparatus is moved so as to seek a separate photo sensor to indicate a starting position. However, the apparatus of the Ito reference does not provide a means to monitor mechanical resistance thereof.

U.S. Pat. No. 5,416,395 to Hiramatsu et al. ("the Hiramatsu reference") describes a carriage drive control for a printer that utilizes a stepper motor in conjunction with an optical encoder. The Hiramatsu reference has two operating modes including closed-loop and stepwise. A controller switches between the two operating modes. When precise regulation of stepper motor speed is required, encoder feedback is processed by the controller and pulse-width-modulated (PWM) current signals are output to the motor in a closed-loop fashion. In both the Ito reference and the Hiramatsu reference, the action of the system is configured to regulate rotational speed of the stepper motor and the corresponding dynamic position error and does not provide a means to monitor mechanical resistance such that preventative maintenance may be performed.

Finally, U.S. Pat. No. 6,121,744 to Hoda et al. ("the Hoda reference") discloses a control apparatus for a position control motor. As understood, the apparatus of the Hoda reference is configured to address a problem in stepper motor application that occurs when registration is lost between desired stepper motor position (as computed by a controller) and actual stepper motor position. In general, open-loop stepper motor systems in such a condition have substantial position error which is not correctable. The apparatus of the Hoda reference monitors static and dynamic error of the stepper motor position using a position feedback device. The apparatus changes the control scheme when this error exceeds ninety degrees of electrical phase difference so as to allow the apparatus to recover. However, the apparatus of the Hoda reference does not include any means to predict and loss of registration between desired and actual stepper motor position.

As can be seen, there exists a need in the art for a servovalve system that includes a simple and reliable initialization feature that does not require the addition of external components to the servovalve system. Additionally, there exists a need in the art for a servovalve system that includes the capability for detecting and monitoring mechanical resistance of a spool sliding within a housing such that preventative maintenance may be performed on the servovalve system.

BRIEF SUMMARY OF THE INVENTION

The present invention specifically addresses and alleviates the above reference deficiencies associated with servovalve systems utilizing stepper motors. More particularly, the present invention is an improved servovalve system having a position sensor and controller that utilizes a unique set of algorithms for detecting and monitoring a level of mechanical resistance occurring within a servovalve assembly. The position sensor and controller also cooperate to allow for simple and reliable initialization of the servovalve system prior to operation thereof. Detection and monitoring of mechanical resistance provides a number of advantages including the ability to perform predictive or preventative maintenance on the servovalve assembly. Predictive maintenance may include, for example, identifying excessive contamination of the servovalve assembly, identifying corrosion of the servovalve assembly that may be causing excessive friction, or identifying excessive wear of servovalve assembly components.

The controller is electronically connected to the stepper motor and is configured to generate a quantity of driver signals. Each one of the driver signals is representative of a desired amount of stepper motor rotation in order to effectuate a predetermined amount of incremental spool motion relative to the housing. The position sensor is electronically coupled to the stepper motor and is configured to sense an actual amount of stepper motor rotation and generate a quantity of position signals representative thereof. The position sensor may preferably be configured as a rotary optical encoder.

The controller is operative to record the quantity of position signals resulting from the quantity of driver signals and determine a signal ratio of the quantity of the position signals to the quantity of the driver signals. The signal ratio may be characterized as an expression of the actual amount of stepper motor rotation to the desired amount of stepper motor rotation. Ultimately, an amount of actual spool motion resulting from an amount of desired spool motion can then be inferred from the signal ratio which may further be characterized as a ratio of stepper motor torque to spool motion. A level of mechanical impedance or resistance to such spool motion may then be inferred from the signal ratio. The level of mechanical resistance may be measured and utilized in the initialization algorithm as well as in the mechanical resistance algorithm.

BRIEF DESCRIPTION OF THE DRAWINGS

These as well as other features of the present invention will become more apparent upon reference to the drawings wherein:

FIG. 1a is a partial cross-sectional view of the rotary-linear converter configured as a linear cam cooperatively engaged to a clamp coupling;

DETAILED DESCRIPTION OF THE INVENTION

Figure 1:
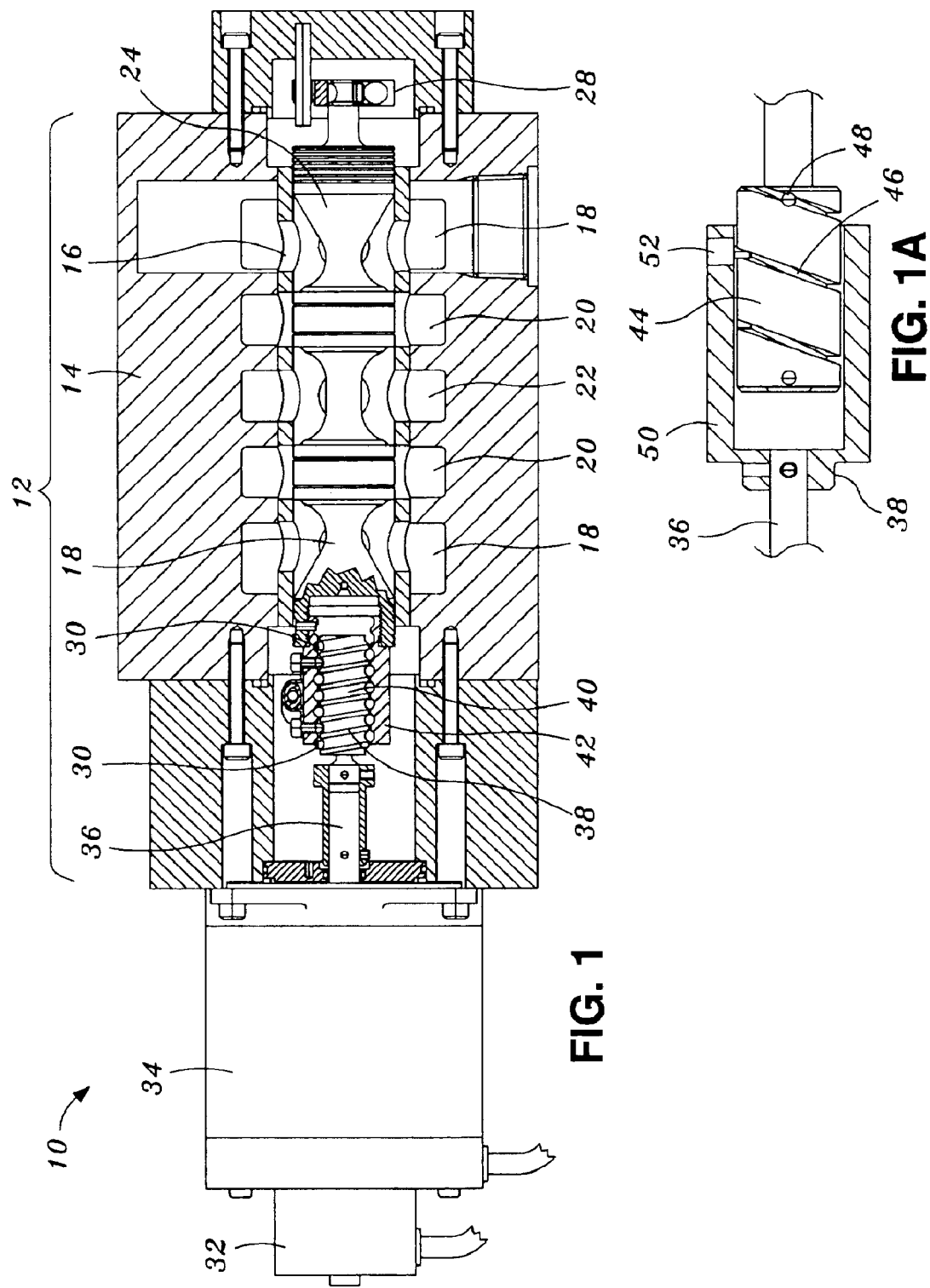
FIG. 1 is a partial cross-sectional view of a servovalve system of the present invention comprising a stepper motor connected to a servovalve assembly by a rotary-linear converter and illustrating a position sensor coupled to the stepper motor.

Referring now to the drawings wherein the showings are for purposes of illustrating the present invention and not for purposes of limiting the same, FIG. 1 illustrates a servovalve system 10 of the present invention comprising a rotary reversible stepper motor 34 connected to a servovalve assembly 12 and illustrating a position sensor 32 electronically coupled to the stepper motor 34. The servovalve assembly 12 includes a spool 24 slidably disposed within a housing 14. The stepper motor 34 is operatively connected to the spool 24 and is configured to move the spool 24 relative to the housing 14.

Figure 2:
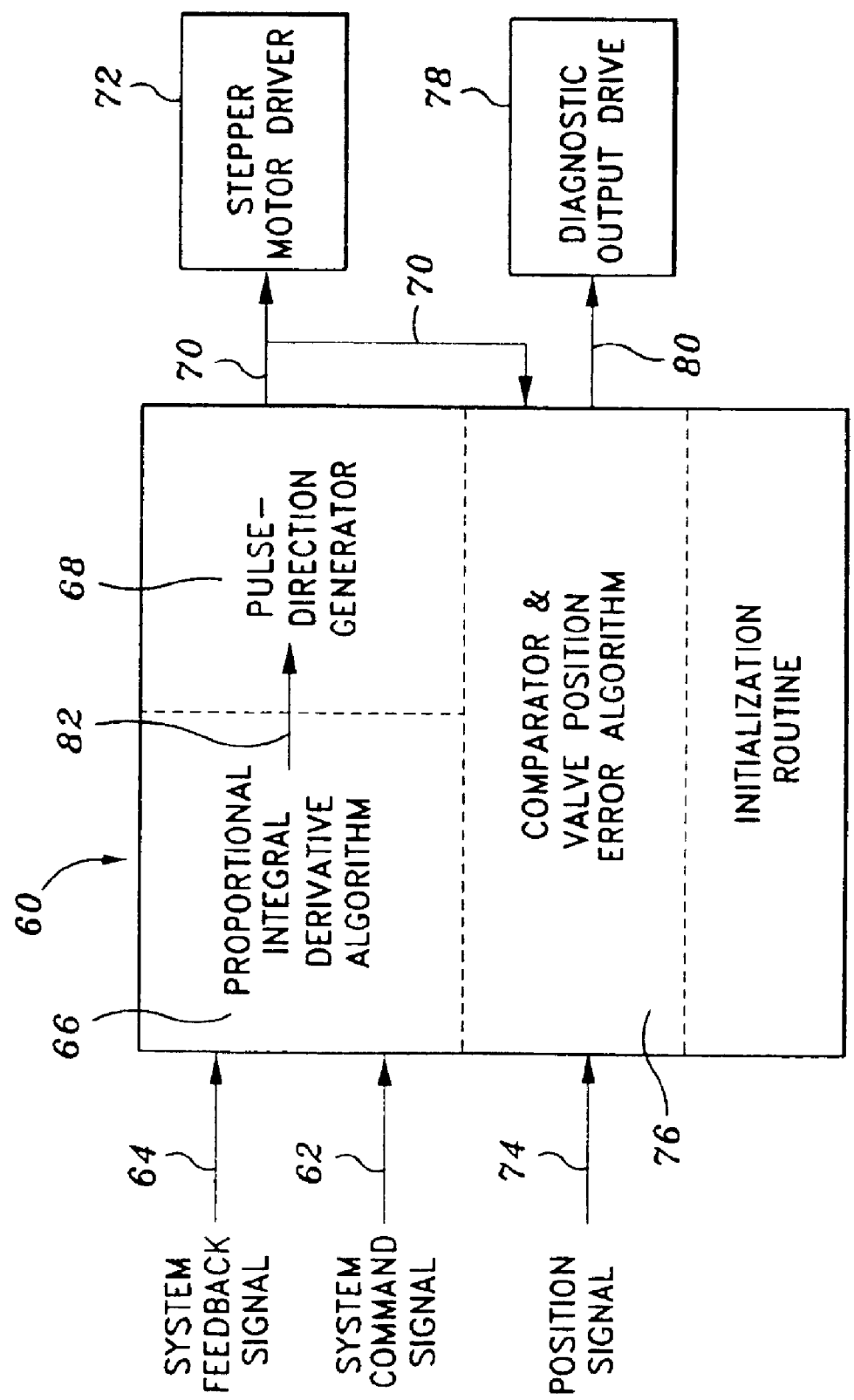
FIG. 2 is a partial block diagram of a controller that cooperates with the position sensor to detect mechanical impediments that may occur within the servovalve assembly.

A controller 60, illustrated in block diagram in FIG. 2, is also included in the servovalve system 10. The controller 60 may be electronically coupled to the stepper motor 34 and is configured to provide microstepping control over the stepper motor 34. The controller 60 and position sensor 32 cooperate to regulate the stepper motor 34 such that the spool 24 may be positioned relative to the housing 14 in order to selectively regulate the flow of fluid within a fluid circuit (not shown). The position sensor 32 is configured to sense an actual amount of stepper motor 34 rotation and provide feedback to the controller 60 through a unique set of algorithms such as an initialization routine illustrated in flow chart form in FIG. 3 and as will be described in greater detail below. The set of algorithms may also include a mechanical resistance detection routine such as is illustrated in flow chart form in FIG. 4 and as will also be described in greater detail below Referring more particularly now to FIG. 1, shown is the servovalve system 10 having the stepper motor 34 operatively connected to the spool 24. The stepper motor 34 is configured to rotate in order to move the spool 24 relative to the housing 14. In the configuration shown in FIG. 1, the spool 24 is axially slidably sealed within the housing 14 such that the stepper motor 34 may linearly translate the spool 24 to a variety of positions. The servovalve assembly 12 illustrated in FIG. 1 is an axial construction sliding spool 24. However, it is contemplated that the servovalve assembly 12 may include a right-angle construction spool or a rotary construction spool slidably disposed within the housing 14. In this regard, it is contemplated that there are a variety of configurations for the servovalve assembly 12 that may be adapted for use with the rotary stepper motor 34.

As shown in FIG. 1, the housing 14 is provided with numerous passages formed therein and through which fluid may be selectively routed for circulation through the fluid circuit. As can be seen, return or exhaust passages 18 are included in the housing 14 along with pressure passages 22 and cylinder passages 20. The exhaust, pressure and cylinder passages 18, 22, 20 are interconnected to ports (not shown) which communicate the fluid through the fluid circuit to the actuator or other fluidic device under control. Also disposed within the housing 14 is a sleeve 16 having a series of openings 26 that are disposed in registration to the exhaust, pressure and cylinder passages 18, 22, 20. Coupled to the spool 24 is a rotary-linear converter 38 which is illustrated in FIG. 1 as a ball screw 40. The ball screw 40 is fixedly secured to the stepper motor 34 on one end by a stepper motor shaft 36. The ball screw 40 is cooperatively engaged to a ball nut 42 on an end of the shaft 36 opposite that which is secured to the stepper motor 34. The ball nut 42 is fixedly secured to the spool 24 on an end thereof.

An anti-rotation device 28 is disposed on an end of the spool 24 opposite that which is secured to the spool 24. The anti-rotation device 28 is configured to prevent rotation of the spool 24 in response to torque of the stepper motor 34. In this manner, rotation of the ball screw 40 by the stepper motor 34 causes the ball nut 42 and, hence, the spool 24, to translate linearly within the housing 14 such that the spool 24 may be selectively positioned within the housing 14. Included with the ball screw 40 may be a pair of mechanical stops 30 disposed on opposing ends thereof. The mechanical stops 30 are configured to limit travel of the ball nut 42 such that axial movement of the spool 24 is restricted.

Referring to FIG. 1a, the rotary-linear converter 38 may be configured as a generally cylindrically shaped linear cam 44 that is concentrically disposed within and cooperatively engaged to a clamp coupling 50. The clamp coupling 50 may include a coupling pin 52 on the clamp coupling 50 to act as the mechanical stop for the servovalve system 10. The linear cam 44 may be connected to either the stepper motor shaft 36 or to the spool 24. The linear cam 44 may also include at least one cam pin 48. At least one groove 46 may be helically formed in the linear cam 44 with the groove 46 being sized complementary to the coupling pin 52 to allow a sliding fit therebetween. The clamp coupling 50 may be connected to the spool 24 or to the shaft 36 of the stepper motor 34. If connected to the stepper motor 34, the rotational motion of the clamp coupling 50 is converted into linear motion of the linear cam 44. Regardless of its configuration, the rotary-linear converter 38 is configured to convert rotational motion of the stepper motor 34 into axial or linear motion of the spool 24 relative to the housing 14.

As was mentioned earlier, the controller 60 is electronically connected to the stepper motor 34 and is configured to generate a quantity of driver signals 70. Each one of the driver signals 70 is representative of a desired amount of stepper motor 34 rotation in order to effectuate a predetermined amount of incremental spool 24 motion relative to the housing 14. As was also earlier mentioned, the position sensor 32 is electronically coupled to the stepper motor 34 and is configured to sense an actual amount of stepper motor 34 rotation and generate a quantity of position signals 74 representative thereof. The position sensor 32 may preferably be configured as a rotary optical encoder although it is contemplated that the position sensor 32 may be configured in a variety of alternative configurations including, but not limited to, a resolver, a rotary variable transformer, and a magnetic encoder.

As will be explained in greater detail below, the controller 60 is operative to record the quantity of position signals 74 resulting from the quantity of driver signals 70 and determine a signal ratio of the quantity of the position signals 74 to the quantity of the driver signals 70. The signal ratio may be characterized as an expression of the actual amount of stepper motor 34 rotation to the desired amount of stepper motor 34 rotation. Ultimately, an amount of actual spool 24 motion resulting from an amount of desired spool 24 motion can then be inferred from the signal ratio which may further be characterized as a ratio of stepper motor 34 torque to spool 24 motion. A level of mechanical impedance or resistance to such spool 24 motion may then be inferred from the signal ratio. The level of mechanical resistance may be measured and utilized in the initialization algorithm as well as in the mechanical resistance algorithm in a manner that will be described in greater detail below.

The initialization algorithm may be programmed into the controller 60 such that the spool 24 may be moved to an initialization position from where the operation of the servovalve system 10 may be initiated such that subsequent spool 24 movements may be accurately and reliably performed by the stepper motor 34. The servovalve system 10 may include a mechanical stop 30 such as that which is included with the ball nut 42 and as is shown in FIG. 1. The stop 30 provides a location for the initialization position of the spool 24. The servovalve system 10 may also be configured such that the stop 30 is incorporated into the cam pin 48 of FIG. 1a. However, it will be appreciated that the stop 30 may be provided in a variety of configurations of the servovalve system 10. Using the initialization algorithm, the controller 60 may be configured to continuously generate driver signals 70 until no position signals 74 are generated in response thereto.

The driver signals 70 are representative of the desired amount of stepper motor 34 rotation while the position signals 74 are representative of the actual amount of stepper motor 34 rotation. The signal ratio may then be used to indicate the point at which no position signals 74 result from the driver signals 70. At such point, it may be inferred that relative spool 24 motion has ceased further indicating that spool 24 motion is prevented by the mechanical stop 30 and that the spool 24 is located at the initialization position. The initialization algorithm is then configured to generate a predetermined quantity of driver signals 70 to cause stepper motor 34 rotation in a direction reverse to that which resulted in locating the spool 24 at the initialization position. The predetermined quantity of driver signals 70 are effective to move the spool 24 from the initialization position to a null position wherein the flow of fluid through the housing 14 may be blocked. The initialization algorithm may also be configured to detect and monitor the level of mechanical resistance in the servovalve assembly 12 such that preventative maintenance may be performed when the mechanical resistance reaches a predetermined threshold level, as will be described in greater detail below.

Referring stil to FIG. 2, the servovalve system 10 may further comprise a diagnostic output device 78 that may be electronically connected to the controller 60. In such a configuration, the controller 60 may be configured to generate a diagnostic signal 80 when the mechanical resistance reaches the predetermined threshold level. The diagnostic output device 78 may be configured to receive the diagnostic signal 80 and generate a warning signal representative of the predetermined level of mechanical resistance of spool 24 motion relative to the housing 14. Upon occurrence of such a condition, the operation of the servovalve system 10 may be restricted pending closer examination of the cause of the increase in mechanical resistance. Preventative maintenance may be performed on the servovalve system 10, if required. It is contemplated that the diagnostic output device 78 may include a display device with the controller 60 being operative to cause the display device to generate a visual indication of the warning signal such that an operator may observe the warning signal and take appropriate action.

Referring now to FIG. 2, shown is a block diagram of the controller 60 configured in accordance with the present invention. It should be noted that the block diagram is shown in simplified form in order to emphasize the elements, functions and software blocks that are relevant to the servovalve system 10 of the present invention. In this regard, it should be noted that the controller 60 may be provided in a variety of alternative embodiments and may include a microcontroller 60 to perform functions of the controller 60. The microcontroller 60 may be provided as a microprocessor-based microcontroller 60 chip or as a digital signal processor microcontroller 60 chip which may be a TMS320LF2407 DSP microcontroller 60 available from Texas Instruments, Inc. However, there exists a wide variety of microcontroller 60 incorporating timers of varying capability therein. In addition, there exists a wide variety of additional functions that may be included with the microcontroller 60.

Referring still to FIG. 2, it should be noted that the block diagram of the controller 60 as shown does not distinguish among the means with which the above-mentioned capabilities and functionalities may be incorporated into the controller 60. Elements of the controller 60 shown in FIG. 2 may be incorporated as hardware, as pre-programmed functions, or as user-programmed software. In this regard, only those elements that are related to closed-loop control of the servovalve assembly 12 are included. However, the outer-loop control of the fluid circuit (e.g., control of the above-described actuator or other device under control in the fluid circuit) may be controlled by a proportional integral derivative (PID) algorithm 66, as shown in the block diagram of FIG. 2. As shown, the PID algorithm 66 accepts an outer-loop system command signal 62 which may be representative of a desired position of the fluidic device under control. Such a fluidic device may be the actuator having the piston slidably sealed within the cylinder and wherein the system command signal 62 is representative of a desired position of the piston relative to the cylinder. The PID algorithm 66 accepts an outer-loop system feedback signal 64 that is representative of an actual position of the fluidic device under control.

A system error signal 82 may be generated by the PID algorithm 66 as a computed difference between the system command signal 62 and the system feedback signal 64. A pulse-direction generator 68 included with the controller 60 receives the system feedback signal 64. The pulse-direction generator 68 may preferably incorporate an internal timer such that the pulse-direction generator 68 may generate a pulse-direction or driver signal 70 that corresponds to a single microstep that is output by a stepper motor driver 72 (not shown) such as an IM483 stepper motor driver available from Intelligent Motion Systems, Inc. of Marlborough, Conn. Microstepping resolution of the stepper motor driver 72 is preferably about thirty-two microsteps per full step positions of the stepper motor 34. The stepper motor 34 utilized in the present invention is preferably provided with a resolution of about two-hundred full steps for each complete revolution such that an overall resolution of about sixty-four-hundred microsteps per revolution of the stepper motor 34 is provided.

Referring still to FIG. 2, the pulse-direction generator 68 generates driver signals 70 to be received by the stepper motor driver 72 to cause the stepper motor 34 to rotate an amount corresponding to a quantity of the driver signals 70. Simultaneously, the driver signals 70 are also received by a comparator-valve position error algorithm 76 of the controller 60 for comparison with position signals 74 generated by the position sensor 32. The comparator-valve position error algorithm 76 allows for confirmation of spool 24 position relative to the housing 14. As was earlier mentioned, position signals 74 are representative of actual stepper motor 34 position after rotation of the stepper motor 34 as a response to the driver signals 70.

The comparator-valve position error algorithm 76 allows for confirmation of spool 24 position by tracking (i.e., counting) a quantity of the position signals 74 that are produced by the position sensor 32 as a result of movement of the stepper motor 34 in response to driver signals 70. A diagnostic signal 80 may then be generated by the comparator-valve position error algorithm 76 should the number of position signals 74 reach a threshold level representative of a predetermined level of mechanical resistance of spool 24 motion relative to the housing 14. As was earlier mentioned, mechanical resistance may be caused by friction occurring during relative motion of the spool 24 and the housing 14.

Determination of the threshold level of mechanical resistance may be performed by first calibrating the servovalve system 10 to determine a baseline level of mechanical resistance. The baseline level of mechanical resistance (e.g., friction) may be obtained by moving (e.g., via the stepper motor 34 in response to driver signals 70) the spool 24 to various position within the housing 14 and noting a difference between resulting ones of the position signals 74 and driver signals 70. The threshold level is an increase by a selected amount of mechanical resistance above the baseline level of mechanical resistance.

It has been observed that unused or relatively new servovalve assemblies generate a relatively low level of sliding friction such that the difference between resulting ones of the position signals 74 and driver signals 70 will be relatively minor. However, the level of mechanical resistance will increase over time due to buildup of corrosion or contamination within the servovalve assembly 12. As a result, a quantity of microsteps (i.e., driver signals 70) required to effectuate a change in relative spool 24 position will also increase over time because stepper motor 34 torque generally increases with an increase in phase difference between a present position of the stepper motor 34 and the sine/cosine profile of electrical current passing through the stepper motor 34 windings. The phase difference may increase up to a maximum of ninety-degrees of electrical phase difference.

However, by monitoring the quantity of driver signals 70 that are required to effectuate a desired amount of stepper motor 34 rotation, stepper motor 34 torque and corresponding levels of mechanical resistance may be inferred. Tracking (i.e., counting) and recording the quantity of the position signals 74 that are produced by the position sensor 32 as a result of movement of the stepper motor 34 in response to the driver signals 70 allows for generation of a profile of servovalve assembly 12 performance such that the diagnostic signal 80 may be produced upon reaching the predetermined level of mechanical resistance.

Figure 4:
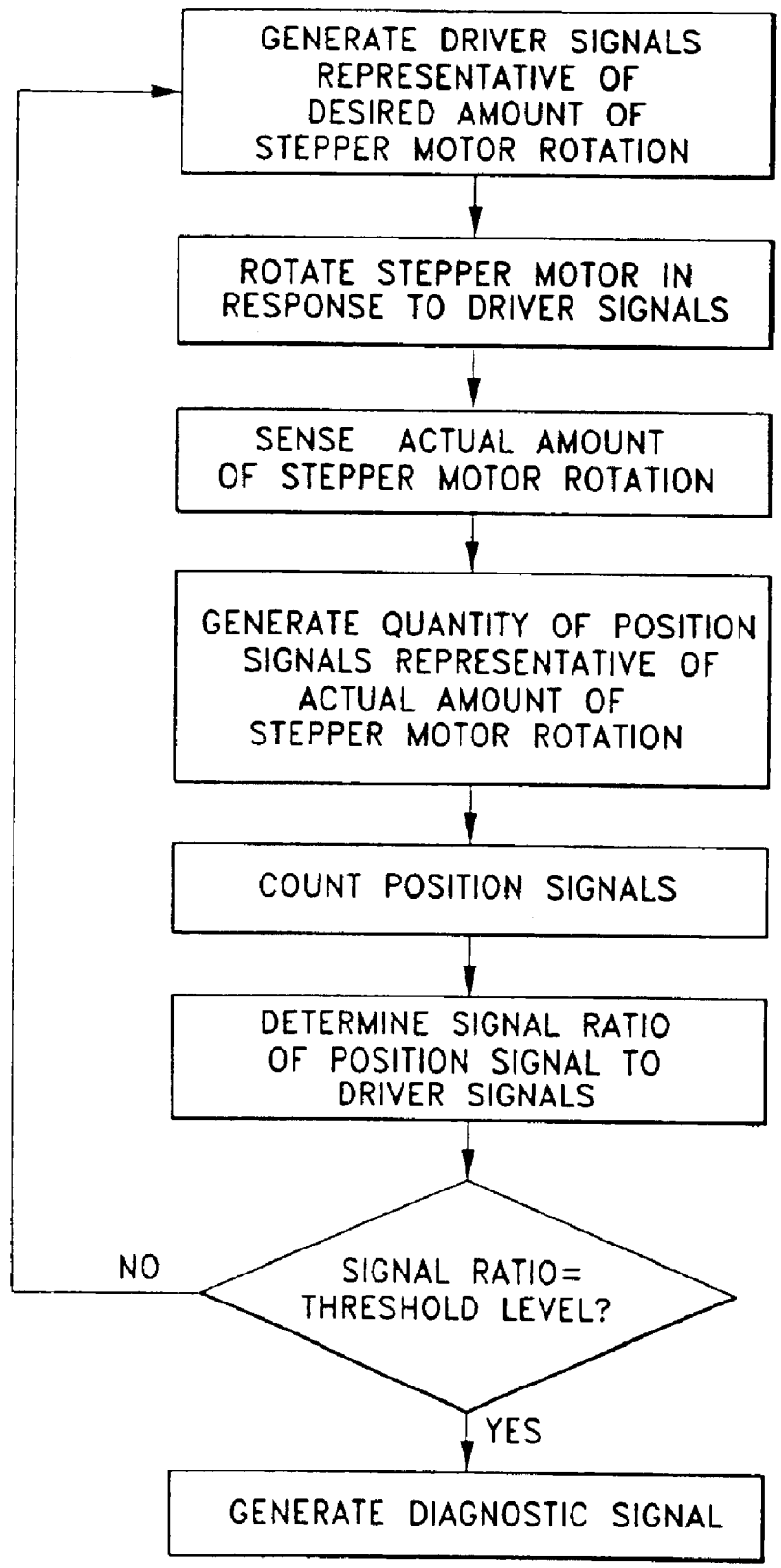
FIG. 4 is a flow chart of a preferred embodiment of a routine for detecting mechanical resistance in the servovalve assembly.

Referring now to FIG. 4, shown is a flow chart of a routine or algorithm representative of a method for detecting an increase in mechanical resistance to relative sliding motion of the spool 24 within the housing 14 of the servovalve assembly 12. As can be seen, the algorithm includes the steps of generating a predetermined quantity of the driver signals 70 wherein each one of the driver signals 70 is representative of the desired amount of stepper motor 34 rotation. The driver signals 70 are generated by the controller 60 in the manner described above. The stepper motor 34 is then rotated in response to the predetermined quantity of driver signals 70 in order to effectuate spool 24 motion relative to the housing 14.

The actual amount of stepper motor 34 rotation is sensed by the position sensor 32. The actual amount of stepper motor 34 rotation occurs in response to the predetermined quantity of driver signals 70. A quantity of position signals 74 representative of the actual amount of stepper motor 34 rotation are then generated and counted. A signal ratio is then determined based upon the quantity of the position signals 74 to the predetermined quantity of driver signals 70. The above steps are repeated until the signal ratio reaches a threshold value representative of the predetermined level of mechanical resistance of spool 24 motion relative to the housing 14. A diagnostic signal 80 may be generated when the signal ratio reaches the threshold level.

Figure 3:
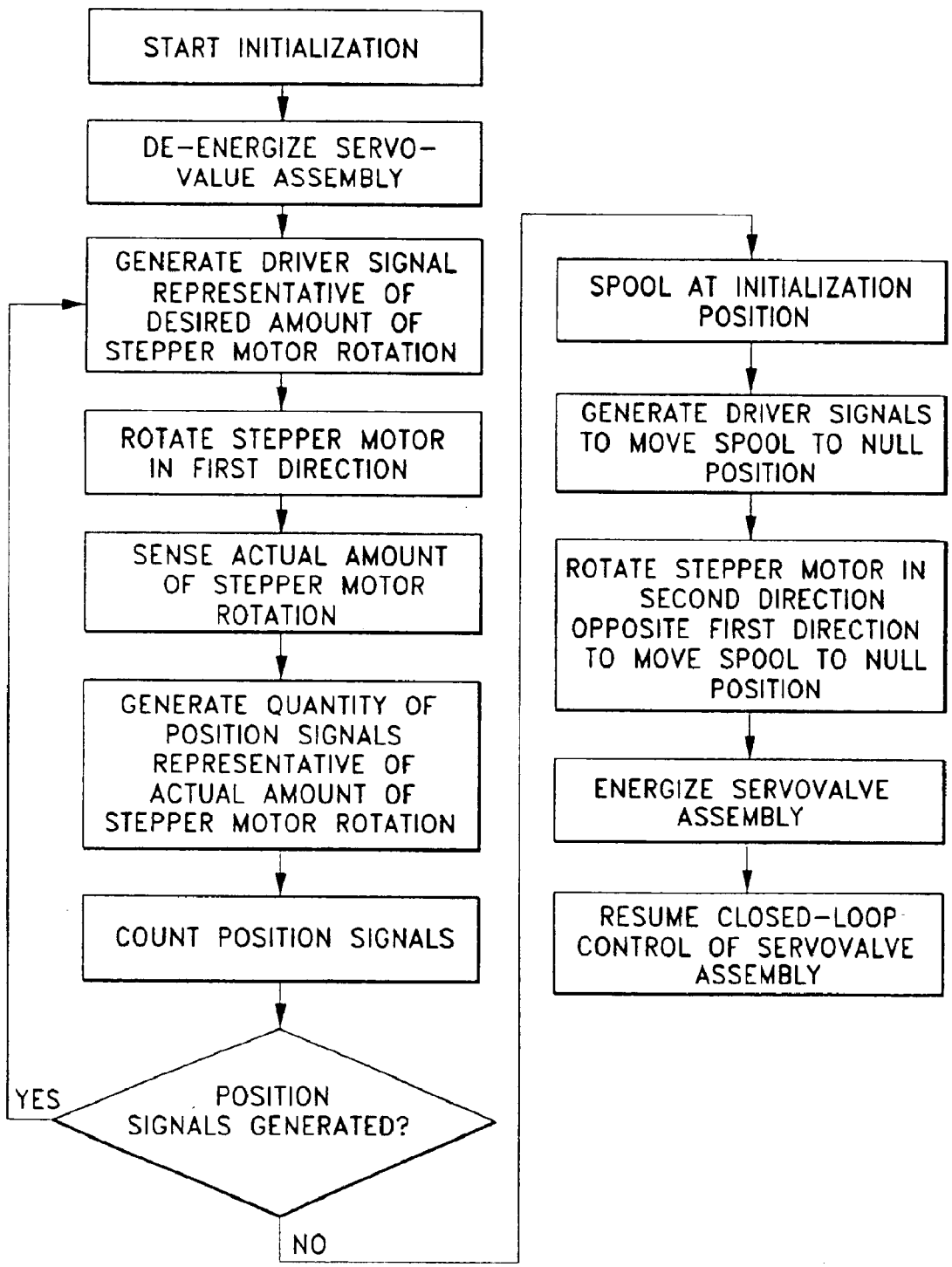
FIG. 3 is a flow chart of a preferred embodiment of an initialization routine adapted for initializing the servovalve assembly.

Referring now to FIG. 3, the initialization algorithm, shown in flow chart format, utilizes the driver signals 70 and position signals 74 in order to locate the initialization position from which the spool 24 may be accurately positioned by the stepper motor 34. The initialization algorithm is particularly useful in servovalve system 10s wherein the spool 24 has a relatively long stroke requiring multiple revolutions of the stepper motor 34 through the rotary-linear converter 38. Instead of utilizing a torsion spring to return the spool 24 to the initialization position, the servovalve system 10 of the present invention advantageously includes at least one of the mechanical stops 30 by which the spool 24 may be restricted against further motion at one of a pair of opposed spool stroke extremes.

It should be noted that locating the spool 24 at one of the pair of spool stroke extremes may typically cause the outer-loop (i.e., fluid circuit) to come to a maximum flow condition. Therefore, prior to initializing the spool 24, an independent safety shutdown may be provided to the servovalve system 10. Such independent safety shutdown may include the step of disconnecting fluid inlet lines to the fluid circuit such that the fluid circuit is depressurized. Alternatively, solenoid valves may be provided in pressure or supply lines of the fluid circuit in order to facilitate the safety shutdown. For the case where the fluid circuit includes the actuator having the piston slidably disposed within the cylinder, it may be desirable to perform the step of de-energizing the servovalve assembly 12 to prevent motion of the piston relative to the cylinder prior to initializing the spool 24. In such a case, cylinder locks may be provided in order to prevent unwanted motion of the piston during initialization.

Referring still to FIG. 3, a method of initializing the servovalve assembly 12, as performed by the initialization algorithm, may include the steps of generating a single one of the driver signals 70 which is representative of the desired amount stepper motor 34 rotation (i.e., a single microstep of rotation). Optionally, an initialization command may be generated by in order to trigger the generation of the driver signal. The servovalve system 10 may be configured such that the initialization command may be automatically generated. Alternatively, the initialization command may be operator-provided or provided by a separate subroutine of the controller 60. The stepper motor 34 is then rotated in a first direction in response to the driver signal 70 in order to effectuate incremental spool 24 motion relative to the housing 14. The actual amount of stepper motor 34 rotation is then sensed by the position sensor 32.

As was earlier mentioned, the actual amount of stepper motor 34 rotation corresponds to and occurs in response to the driver signal. Preferably, the resolution of the position sensor 32 approaches or exceeds the number of microsteps required to effectuate a complete revolution of the stepper motor 34. Following sensing of the actual amount of stepper motor 34 rotation, a quantity of position signals 74 may then be generated by the position sensor 32 with the quantity of position signals 74 being representative of the actual amount of stepper motor 34 rotation. The quantity of position signals 74 resulting from the actual amount of stepper motor 34 rotation is then counted by the controller 60. The above-described steps may be repeated until no position signals 74 are generated in response to the driver signal 70 in order to indicate that the spool 24 is at the initialization position. However, the controller 60 may be configured such that a very small number of position signals 74 are generated in order to indicate that the spool 24 is located at the initialization position.

The allowable number of position signals 74 indicating location of the spool 24 at the initialization position may be preset or it may be updated during calibration. It has been determined that as contact with the mechanical stop 30 occurs as the spool 24 nears the initialization position, the quantity of driver signals 70 tends to increase with no corresponding increase in the quantity of position signals 74. If the allowable difference between the quantity of position signals 74 resulting from corresponding ones of the driver signals 70 is kept small, then it has been determined that contact with the mechanical stop 30 is relatively gentle so as to avoid damage to the servovalve system 10. It has also been confirmed that reliable initialization can be achieved in very large, high-speed servovalve systems 10 with inaudible contact with the mechanical stop 30.

Once the spool 24 is located at the initialization position, the controller 60 then generates a predetermined quantity of driver signals 70 to cause stepper motor 34 rotation effective to move the spool 24 from the initialization position to the null position (i.e., zero-flow condition of the fluid circuit). At the null position, the spool 24 is positioned such that the flow of fluid through the housing 14 is blocked. The stepper motor 34 is rotated in a second direction reverse to that of the first direction in response to the predetermined quantity of driver signals 70 in order to cause the spool 24 to move to the null position. Following initialization of the servovalve system 10, the safety shutdown may be reversed to restore closed-loop control of the servovalve system 10.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A servovalve system for regulating fluid flowing within a fluid circuit, the servovalve system comprising:
   a housing;
   a spool slidably disposed within the housing;
   a stepper motor operatively connected to the spool and being configured to move the spool relative to the housing in order to manipulate the flow of fluid within the fluid circuit;
   a controller electronically connected to the stepper motor and configured to generate a quantity of driver signals, each one of the driver signals being representative of a desired amount of stepper motor rotation in order to effectuate incremental spool motion relative to the housing; and
   a position sensor electronically coupled to the stepper motor, the position sensor being configured to sense an actual amount of stepper motor rotation and generate a quantity of position signals representative thereof;
   wherein the controller is operative to record the quantity of position signals corresponding to the quantity of driver signals, determine a signal ratio of the quantity of the position signals to the quantity of the driver signals, and generate a diagnostic signal when the signal ratio reaches a threshold value representative of a predetermined level of mechanical resistance of spool motion relative to the housing.

2. The servovalve system of claim 1 further comprising:
   a diagnostic output device electronically connected to the controller;
   wherein the controller is configured to generate a diagnostic signal, the diagnostic output device being configured to receive the diagnostic output signal and generate a warning signal representative of the predetermined level of mechanical resistance of spool motion relative to the housing.

3. The servovalve system of claim 2 wherein the diagnostic output device includes a display device, the controller being operative to cause the display device to generate a visual indication of the warning signal.

4. The servovalve system of claim 1 wherein:
   the housing includes at least one mechanical stop configured to restrict motion of the spool relative to the housing;
   the controller is configured to continuously generate driver signals until no position signals are generated in response thereto in order to indicate that the spool is at an initialization position, the controller being further configured to generate a predetermined quantity of driver signals in order to cause stepper motor rotation effective to move the spool to a null position such that the flow of fluid through the housing is blocked.

5. The servovalve of claim 1 wherein the spool is configured to be axially translated by the stepper motor and further comprising:
   a rotary-linear converter interposed between the stepper motor and the spool to convert rotational motion of the stepper motor into axial motion of the spool relative to the housing.

6. The servovalve of claim 5 wherein the rotary-linear converter is configured as a linear cam.

7. The servovalve system of claim 1 wherein the position sensor is a rotary optical encoder.

8. The servovalve system of claim 1 wherein the controller is a digital signal processor.

9. A method for initializing a servovalve system configured to regulate fluid flowing within a fluid circuit, the servovalve system having a servovalve assembly and a reversible stepper motor operatively connected thereto, the servovalve assembly including a housing and a spool moveably disposed therewithin, the servovalve system including at least one mechanical stop restricting motion of the spool relative to the housing, the stepper motor being operative to move the spool relative to the housing in order to manipulate the flow of fluid within the fluid circuit, the method comprising the steps of:

(a) generating a driver signal representative of a desired amount of stepper motor rotation;

(b) rotating the stepper motor in a first direction in response to the driver signal in order to effectuate incremental spool motion relative to the housing;

(c) sensing an actual amount of stepper motor rotation occurring in response to the driver signal;

(d) generating a quantity of position signals representative of the actual amount of stepper motor rotation indicating continuing spool motion;

(e) counting the quantity of position signals resulting from the actual amount of stepper motor rotation;

(f) repeating steps (a) through (e) until no position signals are generated in response to the driver signal in order to indicate that the spool is located at an initialization position;

(f) generating a predetermined quantity of driver signals to cause stepper motor rotation effective to move the spool from the initialization position to a null position such that the flow of fluid through the housing is blocked; and (g) rotating the stepper motor in a second direction reverse to that of the first direction in response to the predetermined quantity of driver signals in order to cause the spool to move to the null position.

10. The method of claim 9 wherein step (a) further comprises the step of generating an initialization command signal in order to cause the driver signal to be generated.

11. The method of claim 9 wherein:
   step (a) further includes de-energizing the servovalve assembly.

12. The method of claim 11 comprising the additional step of:
(h) energizing the servovalve assembly.

13. The method of claim 9 wherein the driver signals are generated by a digital electronic controller.

14. The method of claim 9 wherein the position signals are generated by a position sensor.

15. The method of claim 14 wherein the position sensor is a rotary optical encoder.

16. The method of claim 9 wherein the servovalve assembly is configured such that rotation of the stepper motor is translated into axial motion of the spool relative to the housing.

17. A method for detecting an increase in mechanical resistance to relative sliding motion of a spool within a housing of a servovalve assembly having a stepper motor operatively connected thereto, the stepper motor being configured to move the spool relative to the housing, the method comprising the steps of:
(a) generating a predetermined quantity of driver signals, each one of the driver signals being representative of a desired amount of stepper motor rotation;
(b) rotating the stepper motor in response to the predetermined quantity of driver signals in order to effectuate spool motion relative to the housing;
(c) sensing an actual amount of stepper motor rotation occurring in response to the predetermined quantity of driver signals;
(d) generating a quantity of position signals representative of the actual amount of stepper motor rotation;
(e) counting the quantity of position signals resulting from the actual amount of stepper motor rotation;
(f) determining a signal ratio of the quantity of the position signals to the predetermined quantity of driver signals;
(g) repeating steps (a) through (f) until the signal ratio reaches a threshold value representative of a predetermined level of mechanical resistance of spool motion relative to the housing; and
(h) generating a diagnostic signal when the signal ratio reaches the threshold level.

18. The method of claim 17 wherein the driver signals are generated by a digital electronic controller.

19. The method of claim 17 wherein the position signals are generated by a position sensor.

20. The method of claim 19 wherein the position sensor is a rotary optical encoder.

21. The method of claim 17 wherein the servovalve assembly is configured such that rotation of the stepper motor is translated into axial motion of the spool relative to the housing.

* * * * *